US009149857B2

(12) United States Patent
Quaderer et al.

(10) Patent No.: US 9,149,857 B2
(45) Date of Patent: Oct. 6, 2015

(54) METHOD FOR IMPROVED REINFORCEMENT BAFFLING AND SEALING

(71) Applicant: Zephyros, Inc., Romeo, MI (US)

(72) Inventors: Dean Quaderer, Livonia, MI (US); Erin White, Wales Twp., MI (US); Gary Vanlerberghe, Melvin, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 13/920,402

(22) Filed: Jun. 18, 2013

(65) Prior Publication Data

US 2013/0276309 A1   Oct. 24, 2013

Related U.S. Application Data

(63) Continuation of application No. 12/420,406, filed on Apr. 8, 2009, now Pat. No. 8,479,395.

(51) Int. Cl.
*B61D 29/00* (2006.01)
*B21D 53/88* (2006.01)
*B62D 29/00* (2006.01)

(52) U.S. Cl.
CPC .............. *B21D 53/88* (2013.01); *B62D 29/002* (2013.01); *Y10T 29/18* (2015.01); *Y10T 29/185* (2015.01); *Y10T 29/496* (2015.01); *Y10T 29/49616* (2015.01); *Y10T 29/49622* (2015.01); *Y10T 29/53* (2015.01); *Y10T 156/1003* (2015.01); *Y10T 156/1028* (2015.01)

(58) Field of Classification Search
CPC ........................................................ B21D 53/88
USPC ........ 29/897.2, 6.1, 6.2, 896.6, 897; 156/197, 156/212, 495, 229, 252
See application file for complete search history.

(56) References Cited

U.S. PATENT DOCUMENTS

| 4,297,154 | A | * | 10/1981 | Keller ............................. 156/79 |
| 4,712,868 | A |   | 12/1987 | Tung et al. |
| 4,969,970 | A | * | 11/1990 | Suzuki et al. ................. 156/495 |
| 5,575,526 | A |   | 11/1996 | Wycech |
| 5,755,486 | A |   | 5/1998  | Wycech |

(Continued)

FOREIGN PATENT DOCUMENTS

GB           2 166 688 A    5/1986

OTHER PUBLICATIONS

International Search Report and Written Opinion for corresponding PCT Application No. US/2010/029752 filed Apr. 2,2010; Published as WO 2010/117897.

(Continued)

*Primary Examiner* — Richard Chang
(74) *Attorney, Agent, or Firm* — The Dobrusin Law Firm, PC (57) ABSTRACT

A method for reinforcing, baffling or sealing a vehicle structure, comprising the steps of providing one or more materials having a horizontal axis, at least one terminating edge, and an initial length, forming openings in the one or more materials, and applying the one or more materials to location requiring reinforcement, baffling, sealing or any combination thereof.

20 Claims, 5 Drawing Sheets

(56) References Cited

U.S. PATENT DOCUMENTS

| | | | |
|---|---|---|---|
| 5,766,719 | A | 6/1998 | Rimkus |
| 5,932,680 | A | 8/1999 | Heider |
| 6,131,897 | A | 10/2000 | Barz et al. |
| 6,892,507 | B1 | 5/2005 | Pease |
| 7,199,165 | B2 | 4/2007 | Kassa et al. |
| 7,406,849 | B2 * | 8/2008 | Ueno et al. .................. 72/61 |
| 2004/0076831 | A1 | 4/2004 | Hable et al. |
| 2005/0241756 | A1 | 11/2005 | Harthcock et al. |
| 2005/0260399 | A1 | 11/2005 | Finerman |
| 2007/0117874 | A1 | 5/2007 | Kassa et al. |

OTHER PUBLICATIONS

China First Office Action dated Feb. 22, 2013, Application No. 2010800218603.
China Second Office Action dated Oct. 10, 2013, Application No. 2010800218603.
EP Office Action dated Nov. 24, 2011, Application No. 10714507.0-2425.
EP Office Action dated Oct. 31, 2012, Application No. 10714507.0-2425.
EP Office Action dated Sep. 16, 2013, Application No. 10714507.0-2425.

* cited by examiner

Fig-7

METHOD FOR IMPROVED REINFORCEMENT BAFFLING AND SEALING

TECHNICAL FIELD

The present invention relates generally to a baffling, sealing or reinforcement member that includes one or more materials with formed openings along the one or more materials that allow the materials to stretch.

BACKGROUND

The transportation industry continues to require methods of baffling, sealing and reinforcement that provide improved functionality while simultaneously providing reduced weight and cost. Often, improved functionality is accompanied by an increase in weight and almost always includes an increased cost. For example, improved strength in rigid materials often requires additional material which leads to an increase in both cost and weight. Alternatively, lighter weight materials with improved strength often include an increase in cost as well. Expandable materials are wrought with additional problems. Materials with improved expansion are often difficult to control and are usually paired with increased cost. Additionally, often as the strength of an expandable material increases so does the weight. Adhesive materials also show a tendency for increased cost associated with improved adhesion. The present invention addresses the need for materials that show improved ability for baffling, sealing and reinforcing while providing reduced weight and reduced cost.

SUMMARY OF THE INVENTION

In a first aspect the present invention contemplates a method for reinforcing, baffling, or sealing a vehicle structure comprising: providing one or more materials for reinforcing, baffling or sealing a vehicle structure wherein the one or more materials has a horizontal axis, at least one terminating edge, and an initial length; forming openings in the one or more materials wherein: the openings are formed in repetitive patterns along the one or more materials; the forming of the openings removes no material so that waste is minimized; stretching the one or more materials to a placement length that is at least 1.3 times the initial length, wherein the placement length corresponds to a length of a location requiring reinforcement, baffling, sealing or any combination thereof; applying the one or more stretched materials to the location requiring reinforcement, baffling, sealing or any combination thereof so that the total amount of material applied is less than would be required if the material contained no openings.

This first aspect of the invention may further be characterized by one or any combination of the following features: the one or more materials includes an expandable material that is formed of a heat activated material having foamable characteristics, the one or more materials includes a rigid polymeric material, the one or more materials includes an adhesive material, the openings are formed with a die-cutting process, the openings are formed with a rotary cutting process, the openings are formed in an alternating manner, so that the one or more materials containing the openings remain connected, the openings are formed perpendicular to the horizontal axis of the one or more materials, a plurality of the openings sever the one or more materials at the horizontal axis so that the one or more materials remain connected at only the at least one terminating edge, a plurality of the openings sever the one or more materials at the at least one terminating edge so that the one or more materials remain connected at only along the horizontal axis, the openings alternate so that every other opening severs the one or more materials at the at least one terminating edge and the remaining adjacent openings sever the one or more materials at the horizontal axis so that stretching capability of the one or more materials is maximized while the one or more materials remain connected, the one or more materials are twisted upon application to the location requiring reinforcement, baffling, sealing or any combination thereof.

In a second aspect of the present invention, there is contemplated a method for reinforcing, baffling, or sealing a vehicle structure comprising: providing one or more materials for reinforcing, baffling or sealing a vehicle structure wherein the one or more materials has a horizontal axis, at least one terminating edge, and an initial length; forming openings in the one or more materials wherein: the openings are formed perpendicular to the horizontal axis; the openings alternate so that every other opening severs the one or more materials at the at least one terminating edge and the remaining adjacent openings sever the one or more materials at the horizontal axis; the forming of the openings removes no material so that waste is minimized; stretching the one or more materials to a placement length that is at least 1.3 times the initial length, wherein the placement length corresponds to a length of a location requiring reinforcement, baffling, sealing or any combination thereof; applying the one or more stretched materials to the location requiring reinforcement, baffling, sealing or any combination thereof so that the total amount of material applied is less than would be required if the material contained no openings.

This aspect may be further characterized by one or any combination of the following features: the one or more materials includes an expandable material that is formed of a heat activated material having foamable characteristics, the openings allow the expandable material to expand to a more consistent height and width than if the material contained no openings, the one or more materials includes a rigid polymeric material, the one or more materials includes an adhesive material, the openings are formed with a die-cutting process.

In a further aspect, the present invention contemplates a method for reinforcing, baffling, or sealing a vehicle structure comprising: providing an expandable material for reinforcing, baffling or sealing a vehicle structure wherein the expandable material has a horizontal axis, two terminating edges, and an initial length; die-cutting openings in the expandable material wherein: the openings are cut perpendicular to the horizontal axis; the openings alternate so that every other opening severs the expandable material at the two terminating edges and the remaining adjacent openings sever the expandable material at the horizontal axis so that the openings allow the expandable material to expand to a more consistent height and width than if the material contained no openings; the die-cutting of the openings removes no material so that waste is minimized; stretching the expandable material to a placement length that is at least 1.5 times the initial length, wherein the placement length corresponds to a length of a location requiring reinforcement, baffling, sealing or any combination thereof; applying the stretched expandable material to the location requiring reinforcement, baffling, sealing or any combination thereof so that the total amount of expandable material applied is less than would be required if the expandable material contained no openings.

DETAILED DESCRIPTION

The text of the drawings and the above Summary of the Invention are incorporated by reference. The entirety of all patents and publications cited are hereby incorporated by reference for all purposes.

The present invention allows for the customization of one or more materials for baffling, sealing or reinforcement. The embodiments disclosed herein describe a method for forming openings in materials so that the materials can be adjusted to a desired length, shape, curvature or any combination thereof for more precise fit within a vehicle structure. The materials disclosed herein can be further customized for preferred expansion characteristics.

Figure 1A:
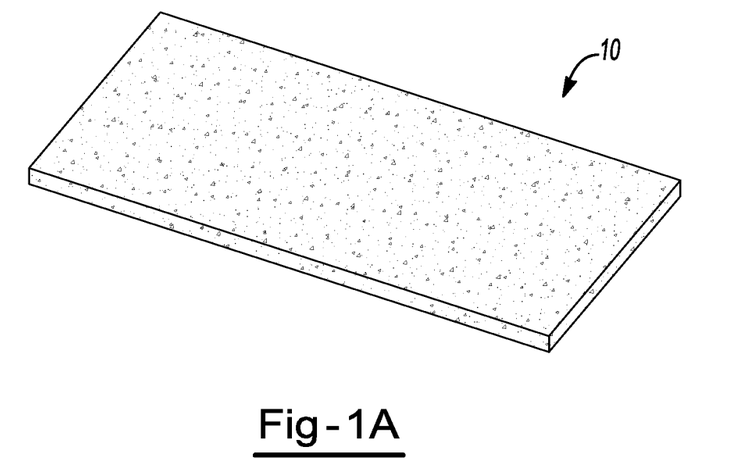
FIG. 1A illustrates an expandable material with no formed openings.
Figure 1B:
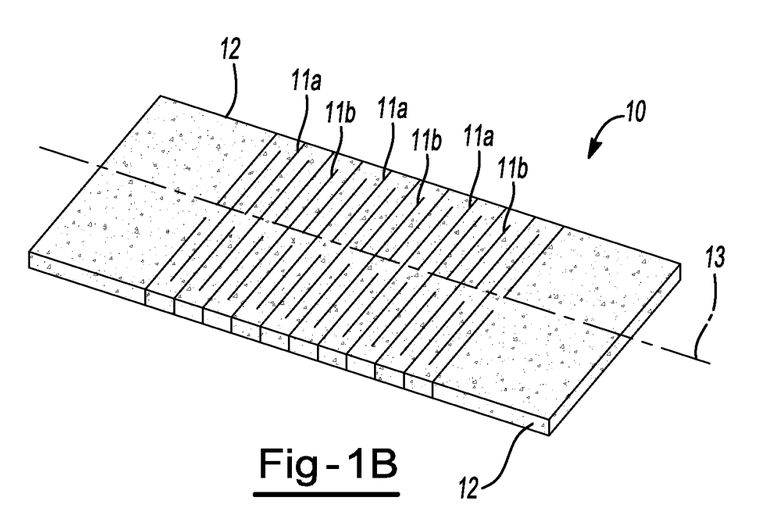
FIG. 1B illustrates the expandable material of FIG. 1A including formed openings.

FIGS. 1A and 1B show an expandable material 10 before (FIG. 1A) and after (FIG. 1B) forming of the openings 11. Openings 11a are shown as two slits severing the expandable material 10 from both terminating edges 12 while the expandable material remains connected at the horizontal axis 13 between the two slits. Openings 11b are shown as one slit severing the expandable material at the horizontal axis 13, while the expandable material remains connected at the terminating edges 12. Openings 11a and 11b are shown as alternating along the length of the expandable material. The openings 11a and 11b are shown as slits within the expandable material so that no material is removed during cutting and waste is thereby minimized. The openings can be formed in any pattern and in any location along a material for baffling, sealing or reinforcement, so long as the openings allow the material to be stretched to at least 1.2 times the original length of the material. The slits may be cut small so that minimal stretching occurs, or the slits may be large, such that only a small amount of the material remains connected thereby allowing for maximum stretching. The slits may be formed to any size according to the amount of stretching required. The openings may be formed in close proximity to one another as shown in FIG. 1B. The openings may also be formed with a predetermined amount of space between each opening so that a certain amount of un-cut material remains between each opening. The openings may be formed in repetitive patterns or may be formed at random locations with no specific organization.

The size of the formed openings may generally depend on the size of the material being cut. In preferred embodiments, the openings will generally range from about 10 mm to about 150 mm. More preferably, the size of the openings will range from about 15 mm to about 30 mm. However, if the material is particularly large (e.g., having a height (h) greater than about 200 mm) or particularly small (e.g., having a height (h) less than about 40 mm) the openings may be larger or smaller in accordance with the relative height of the starting material.

Figure 2A:
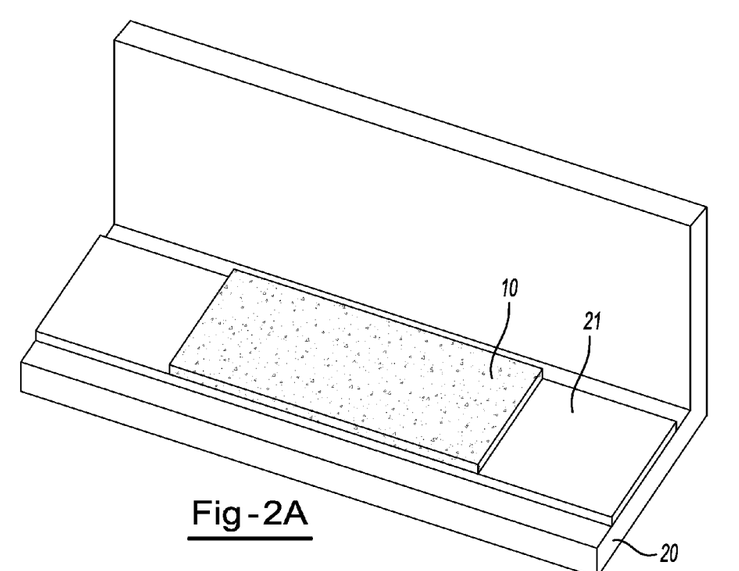
FIG. 2A illustrates the expandable material of FIG. 1A applied to a baffle including a carrier.
Figure 2B:
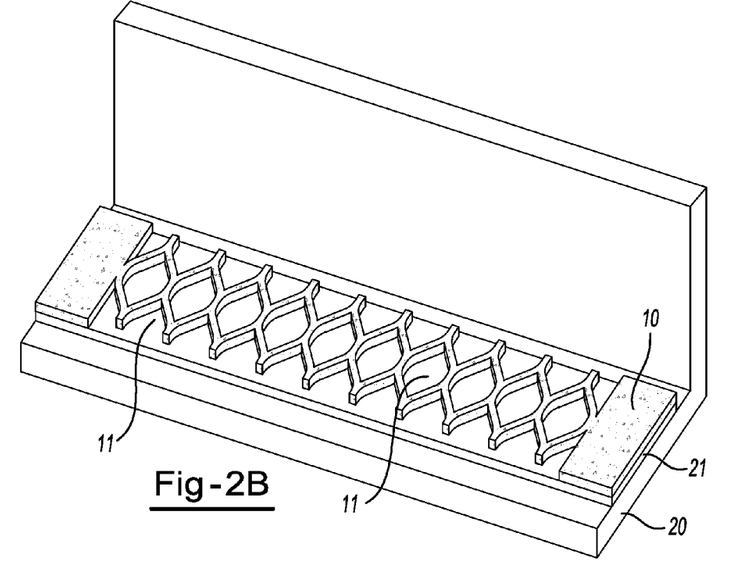
FIG. 2B illustrates the expandable material of FIG. 1B applied to a baffle including a carrier.

In preferred embodiments, after the openings are formed, the material can be placed within and/or in contact with any vehicle structure at any location requiring baffling, sealing or reinforcement. FIG. 2A shows the expandable material 10 shown at FIG. 1A applied to a baffle 20 including a carrier 21. The expandable material is able to cover only a small portion of the carrier. However, as illustrated in FIG. 2B, the expandable material shown in FIG. 1B can be stretched and applied to the baffle 20 and carrier 21. The expandable material with the openings 11 is able to stretch the entire length of the carrier 21. The amount of starting expandable material 10 shown in FIGS. 1A and 1B is the same, but the formed openings 11 allow for extended coverage of the carrier 21.

Figures 3A, 3B:
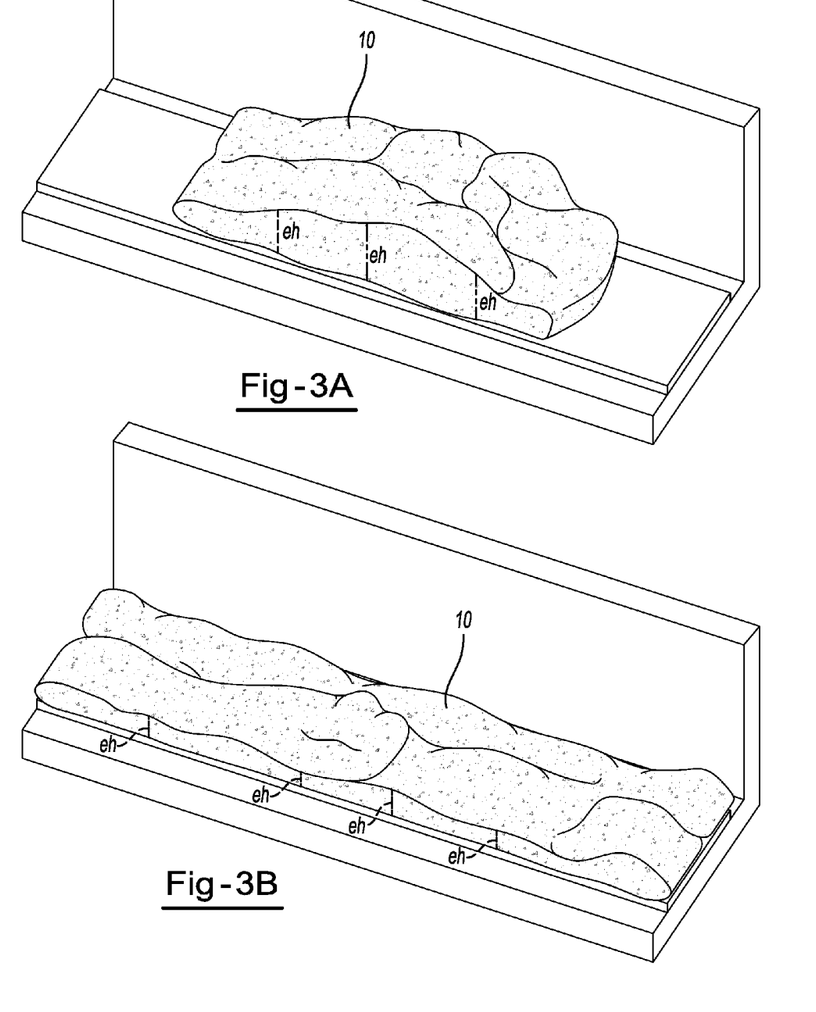
FIG. 3A illustrates the baffle of FIG. 2A after activation of the expandable material.
FIG. 3B illustrates the baffle of FIG. 2B after activation of the expandable material.

After application of the expandable material 10 into and/or in contact with a vehicle structure, the expandable material may expand via a predetermined set of conditions. For example, exposure to certain levels of heat may cause the expandable material to expand. FIG. 3A illustrates the expansion characteristics of the expandable material 10 with no formed openings shown at FIGS. 1A and 2A. FIG. 3B illustrates the expansion characteristics of the expandable material 10 with formed openings 11 shown at FIGS. 1B and 2B. The expansion height (eh) of the expandable material 10 shown in FIG. 3A is inconsistent along the length of the expandable material 10. The expansion height (eh) of the expandable material 10 shown in FIG. 3B is relatively consistent along the length of the expandable material 10. A more consistent expansion height allows for improved reinforcement, baffling, and sealing, whereas an inconsistent expansion height results in possible weak spots and discontinuous sealing.

Figure 4:
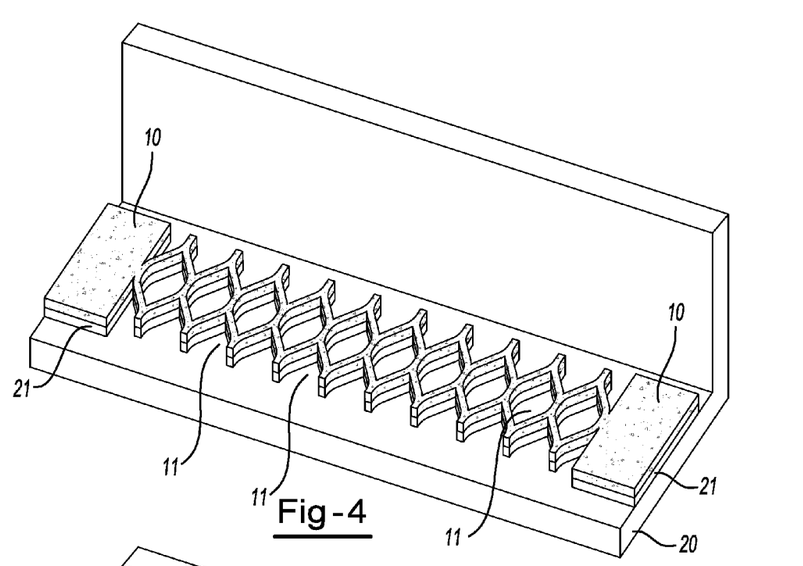
FIG. 4 illustrates a baffle where both the carrier and expandable material include complimentary formed openings.
Figure 5:
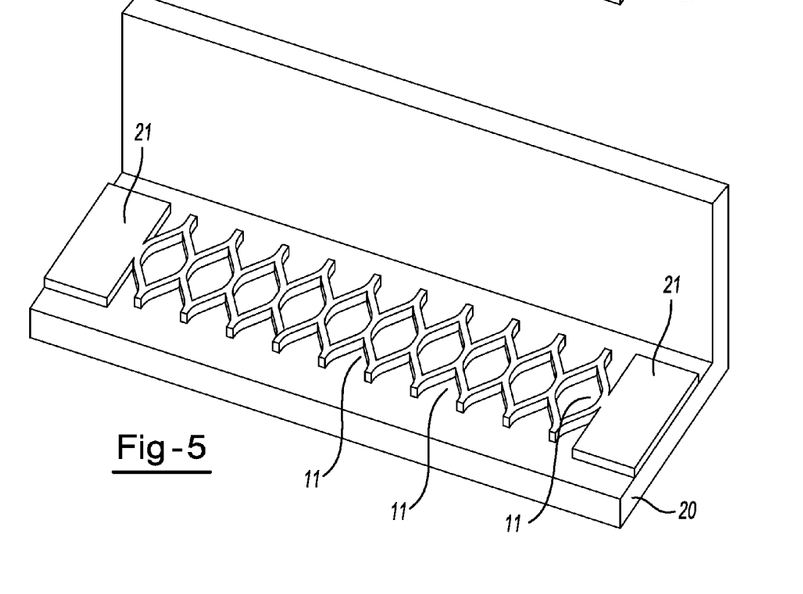
FIG. 5 illustrates a baffle including only a carrier material including formed openings.

In one embodiment of the present invention, the carrier 21 may also include formed openings, as shown in FIG. 4. The formed openings 11 in the carrier material may be similar to the pattern shown in the expandable material 10, as illustrated in FIG. 4, or the formed openings may be cut in a pattern that differs from that formed in the expandable material 10. In another embodiment, formed openings 11 may be formed in the carrier material 21 and the carrier material may be used to provide reinforcement without the use of any expandable material, as shown in FIG. 5.

Figure 6:
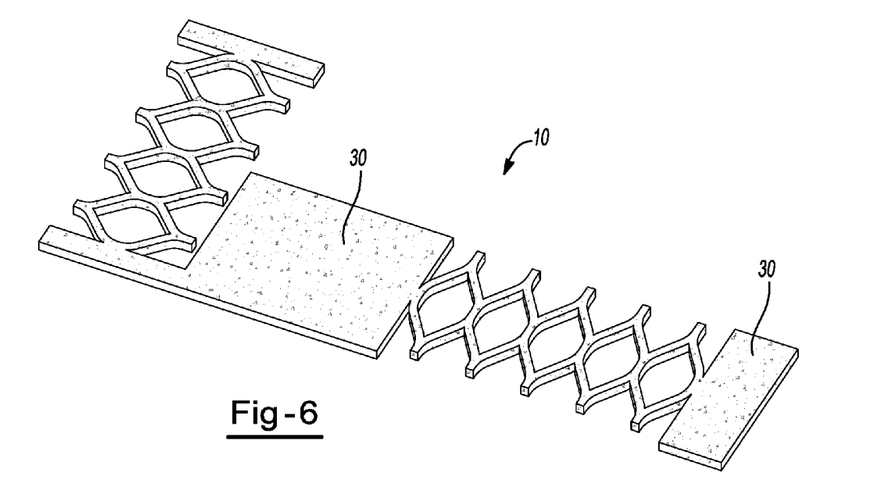
FIG. 6 illustrates an expandable material including formed openings that are cut to fit a specific cavity shape.

In preferred embodiments, the material for baffling, sealing and reinforcement may have openings that are formed in a specific pattern so that the material will fit the shape of a particular vehicle cavity. As illustrated in FIG. 6, an expandable material 10 may have openings formed so that the material may be stretched in two opposing directions according to the profile of a vehicle cavity. Further, the expandable material may include sections 30 with no openings to account for vehicle cavity areas that may require an increased expansion height.

Figure 7:
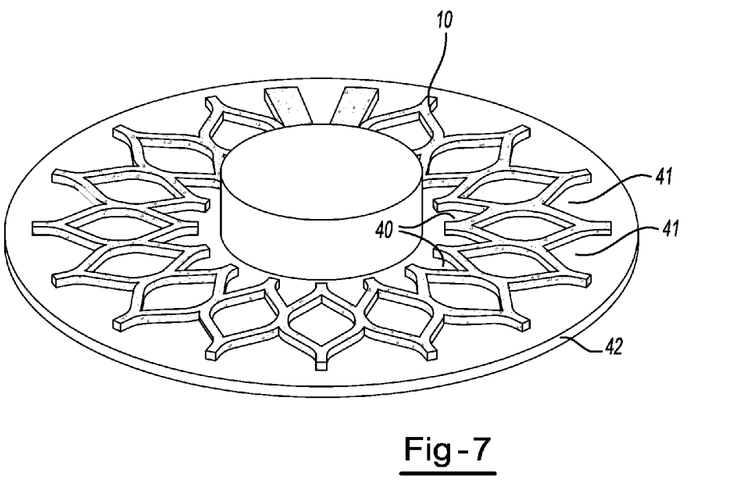
FIG. 7 illustrates a material of the present invention applied to a vehicle structure of circular shape.

The openings may also be formed so that the material can be stretched and curved to fit along a curved surface. As illustrated in FIG. 7, expandable material 10 may be cut so that smaller slits are formed in the top portion 40 of the material and larger slits are formed in the bottom portion 41 of the material. This allows the expandable material 10 to be placed along a curved surface 42 within a vehicle structure, while allowing the material to lay flush against the surface thereby maintaining equal coverage around the surface.

The formed openings of the present invention also provide space for fasteners and/or weld spots. Preferably, the material can be applied to a vehicle structure and additional parts or materials can be attached with fasteners that are exposed via a formed opening. Further, the formed openings may allow for welding processes to be performed on areas of a vehicle structure that are exposed via a formed opening. With the use of existing materials for baffling, sealing and reinforcement, once the materials are applied to a vehicle structure, access to the underlying structure is no longer feasible due to the solid nature of the materials. The formed openings of the present invention allow access to an underlying vehicle structure after application of the material.

In preferred embodiments, the openings may be formed in the materials of the present invention using a die-cutting process. The openings may also be rotary cut. The openings may be press cut or cut with a laser or water jet. Alternatively, the openings may be molded into the materials.

In preferred embodiments, the material for baffling, sealing, or reinforcement may include a means for maintaining the material within and/or in contact with a vehicle structure. The means may include a fastener such as a tree-fastener or a threaded screw fastener. The fastener may also be provided in a variety of shapes and in a variety of configurations so long as it can secure the material for baffling, sealing or reinforcement to a structure. Preferably, the fastener is capable of securing multiple layers or types of materials to a structure. Examples of suitable fasteners include mechanical fasteners, clips, snap-fits, screws, hooks, combinations thereof or the like. For attachment to a vehicle structure, the formed openings may also be cut to fit around tabs located on the vehicle structure in order to hold the material in place. Furthermore, it is contemplated that the one or more fasteners may be formed integral of a singular material with the material for baffling, sealing or reinforcement or may be formed of a different material and may be removably attached to the carrier.

According to one preferred embodiment, the fastener is provided as a magnetic material or an adhesive material that can attach (e.g., adhere or magnetically secure) material for baffling, sealing, or reinforcement to the structure. In such an embodiment, the magnetic material or the adhesive material may be interspersed with a carrier material or an expandable material. Alternatively, the magnetic material or the adhesive material may be disposed upon the carrier material and/or the expandable material or may be otherwise connected to the carrier material and/or the expandable material.

The material for baffling, sealing, or reinforcement can be formed of a variety materials such as polymers, elastomers, fibrous materials (e.g., cloth or woven materials), thermoplastics, plastics, nylon, combinations thereof or the like. The material may also be an expandable material formed of a heat activated material having foamable characteristics. The material may be generally dry to the touch or tacky and may be shaped in any form of desired pattern, placement, or thickness, but is preferably of substantially uniform thickness. Though other heat-activated materials are possible for the expandable material, a preferred heat activated material is an expandable polymer or plastic, and preferably one that is foamable. A particularly preferred material is a relatively high expansion foam having a polymeric formulation that includes one or more of an acrylate, an acetate, an elastomer, a combination thereof or the like. For example, and without limitation, the foam may be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Preferred materials are disclosed in U.S. Pat. No. 7,199,165 and U.S. Patent Publication No. 2007/0117874.

A number of baffling or sealing foams are known in the art and may also be used to produce the foam. A typical foam includes a polymeric base material, such as one or more ethylene-based polymers which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable material before curing, and upon curing, the material will typically cross-link making the material incapable of further flow.

While the preferred materials for fabricating the expandable material have been disclosed, the expandable material can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680, incorporated by reference herein.

The materials for baffling, sealing and reinforcement may also include an adhesive. The adhesive material is typically an activatable material meaning that the adhesive material can be activated to melt, adhere, foam, expand, cure, thermoset or any combination thereof, although not necessarily required. Such activation is typically brought about by exposure of the adhesive material to a condition such as heat, radiation, moisture or the like. It is also contemplated that the adhesive material may be used alone or may be used in conjunction with a carrier material, an expandable material or additional expandable material or any combination thereof for forming a reinforcement, baffle or seal.

The adhesive material may have a polymeric formulation that includes or is based upon one or more of an epoxy, an acrylate, an acetate, an ethylene polymer (e.g., copolymer), an elastomer, a combination thereof or the like. The adhesive material may be particularly useful for applications including sealing and/or structural reinforcement and/or adhesion. For structural applications, expansion of the adhesive material is typically small if there is any expansion at all.

The adhesive material may be a pressure-sensitive material that is activatable upon application of predetermined pressure conditions. One particularly useful material is described in U.S. Patent Publication No. 2005/0241756.

In applications where the adhesive material or any other expandable material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat, paint or clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C.-150° C.).

The materials may also include a film layer, such as that disclosed in U.S. Patent Publication Nos. 2004/0076831 and 2005/0260399. The film layer may be applied prior to forming openings within the material or may be applied after forming of the openings. The film layer may be used to cover a material that is tacky to the touch. The film layer may be removed from the material prior to application of the material to a vehicle structure, such that the film will reveal a tacky surface of the material that will adhere to the structure.

Formation of the materials of the present invention may include a variety of processing steps depending on the desired configuration of the materials. The preferred materials can be processed by injection molding, extrusion compression molding or with a mini-applicator. It is generally contemplated one or more layers of materials or one or more different types of materials, including any fasteners and adhesives may be manually attached to each other, automatically attached to each other or a combination thereof. Moreover, various processes such as molding (e.g., compression, injection or other molding), extrusion or the like may be used to form a carrier material and an expandable material individually and such processes may be employed to attach these materials together.

The thickness of the materials of the present invention for any of the embodiments herein is from about 0.2 mm to about 10 mm, depending on the composition of material used. More preferably, the thickness of the materials is about 1 mm to about 5 mm. Most preferably, the thickness of the material is from about 1.5 mm to 2.5 mm. The materials should be thick enough so that the risk of breakage after forming of the openings is reduced. Further, the materials cannot be so thick so as to prevent forming of the openings via any cutting method disclosed herein.

Unless stated otherwise, dimensions and geometries of the various structures depicted herein are not intended to be restrictive of the invention, and other dimensions or geometries are possible. Plural structural structures can be provided by a single integrated structure. Alternatively, a single integrated structure might be divided into separate plural structures. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed:

1. A reinforcing, baffling, or sealing device for vehicle cavity comprising:
   an insert formed from one or more expandable materials prior to expansion wherein the insert has a horizontal axis, at least one terminating edge, and an initial length;
   a plurality of openings formed in the insert so that the insert can be stretched to a placement length that is at least 1.3 times the initial length;
   wherein the insert is applied to a carrier which is adapted to be located into a vehicle cavity; and
   wherein the expendable material is formed of a heat activated material having foamable characteristics.

2. The device of claim 1, wherein the plurality of openings are formed in repetitive patterns along the insert.

3. The device of claim 1, wherein the forming of the plurality of openings removes no material so that waste is minimized.

4. The device of claim 1, wherein the plurality of openings are formed in an alternating manner, so that the one or more materials forming the insert containing the openings remain connected.

5. The device of claim 1, wherein at least one or more of the openings of the plurality of openings is formed perpendicular to the horizontal axis of the one or more materials.

6. The device of claim 5, wherein the plurality of openings sever the one or more materials at the horizontal axis so that the one or more materials remain connected at only the at least one terminating edge.

7. The device of claim 5, wherein at least one or more of the openings of the plurality of openings sever the insert at the at least one terminating edge so that the insert remains connected only along the horizontal axis.

8. The device of claim 6, wherein at least one or more of the openings of the plurality of openings sever the insert at the at least one terminating edge so that the insert remains connected at only along the horizontal axis.

9. The device of claim 5, wherein the plurality of openings alternate so that every other opening severs the insert at the at least one terminating edge and the remaining adjacent openings sever the insert at the horizontal axis so that the stretching capability of the insert is maximized while at least a portion of the insert remains connected.

10. The device of claim 1, wherein the openings allow the expandable material to expand to a more consistent height and width than if the material contained no openings.

11. The device of aim 1, wherein the insert expands only after insertion into the vehicle cavity.

12. The device of claim 1, wherein the plurality of openings are located on the insert in a repeated pattern.

13. The device of claim 1, wherein the plurality of openings is comprised of at least one or more individual openings having a diameter and the largest diameter of each individual opening is from about 16 mm to about 30 mm.

14. The device of claim 1, wherein the insert has a height and post-expansion the height of the insert is substantially consistent along the insert.

15. The device of claim 1, wherein at east a portion of the insert is substantially solid and contains no openings.

16. The device of claim 1, wherein the openings allow access to areas beneath the insert prior to expansion of the expandable material.

17. The device of claim 1, wherein the expandable material is a polymeric high expansion foam.

18. The device of claim 1, wherein the openings allow the insert to be stretched and curved to fit along a curved surface.

19. A reinforcing, baffling, or sealing device for a vehicle cavity comprising:
   an insert formed from one or more expandable materials prior to expansion wherein the insert has a horizontal axis, at least on terminating edge, and an initial length;
   a plurality of openings formed in the insert so that the insert can be stretched to a placement length that is at least 1.3 times the initial length;
   wherein the insert is applied to a carrier which is adapted to be located into a vehicle cavity; and
   wherein the insert is twisted upon locating insert in the vehicle cavity.

20. A reinforcing, baffling, or sealing device for a vehicle cavity comprising:
- an insert formed from one or more expandable materials prior to expansion wherein the insert has a horizontal axis, at least on terminating edge, and an initial length;
- a plurality of openings formed in the insert so that the insert can be stretched to a placement length that is at least 1.3 times the initial length;
- wherein the insert is applied to a carrier which is adapted to be located into a vehicle cavity; and
- wherein after expansion of the expandable material the openings are not visible on the insert.

* * * * *